United States Patent Office 3,403,926
Patented Oct. 1, 1968

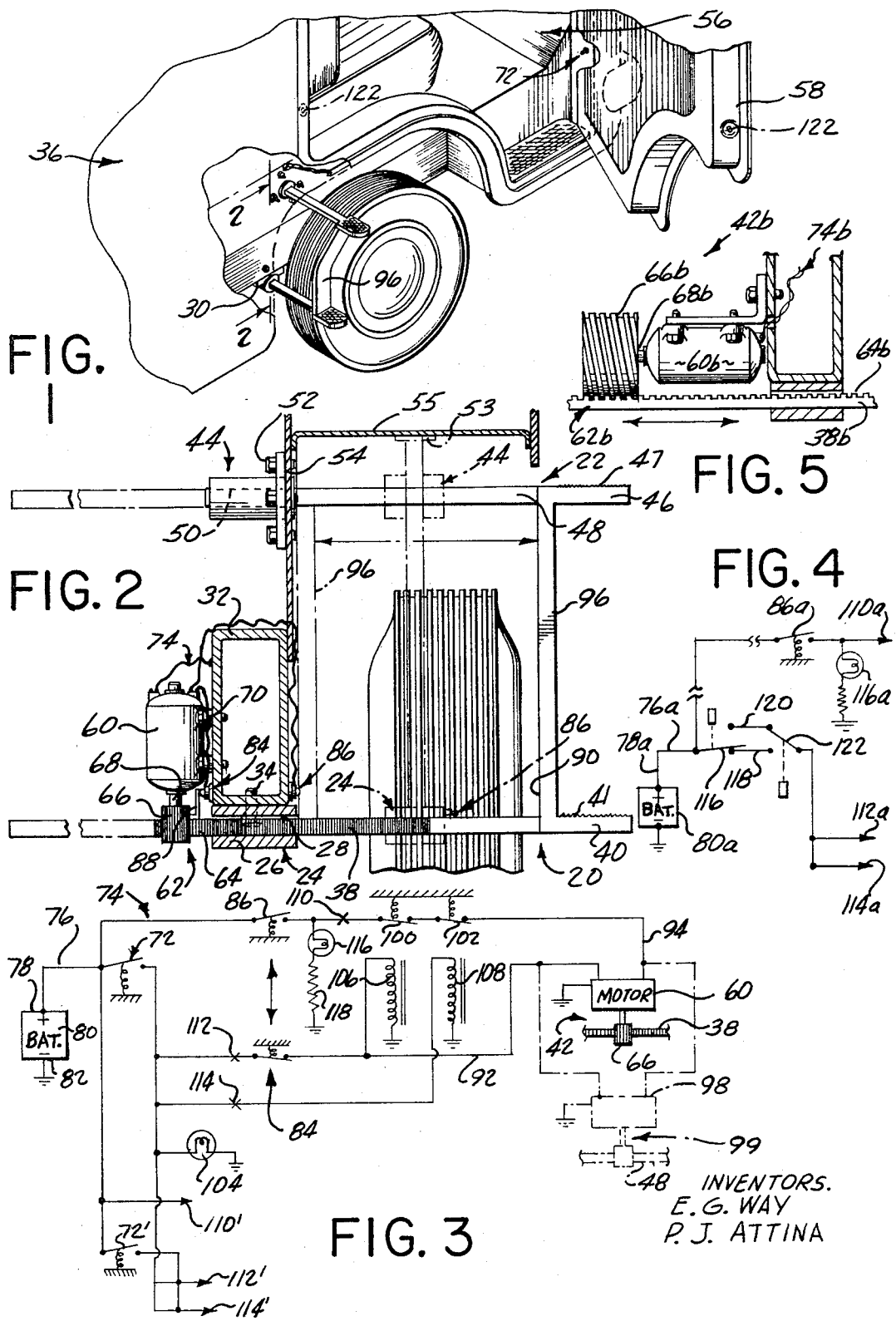

3,403,926
EXTENDABLE AND RETRACTABLE
STEP APPARATUS
Edgar G. Way, Los Angeles, and Peter J. Attina, Montebello, Calif. (both of P.O. Box 18948, Los Angeles, Calif. 90018)
Filed June 13, 1966, Ser. No. 557,132
14 Claims. (Cl. 280—166)

ABSTRACT OF THE DISCLOSURE

The specification discloses extendable and retractable step apparatus, in one preferred form intended primarily for use on a van type of motor vehicle adjacent to a van type door normally closing an interior access opening of a type which is sometimes difficult to enter if the door cannot be fully opened. The extendable and retractable step apparatus of the present invention solves this problem by providing a pair of conveniently located, properly spaced, and differently elevated entry steps for the door access opening which are normally retracted but which are extended only when needed for use. This is accomplished by controllably electrically energizable and de-energizable extension actuator means effectively coupled with respect to the pair of steps for controllable outward extension thereof from normal retracted positions thereof when said actuator means is energized in an extension manner and for controllable retraction thereof when said actuator means is energized in a retraction manner. The energization of said actuator means in the extension manner and in the retraction manner is under the control of energization initiation switch means adapted to be operated when a person wishes to enter or leave the interior of a van type motor vehicle or the like through the partially open door thereof by stepping upon the pair of step means of the present invention to facilitate the entering or leaving of the vehicle.

Generally speaking, the present invention relates to extendable and retractable step apparatus which can be mounted wherever such extendable and retractable step apparatus could be advantageously used, but, more particularly, in one preferred exemplary form of the present invention, the extendable and retractable step apparatus may be mounted on and attached to a lower body and/or frame portion of a motor vehicle adjacent to a door of the motor vehicle so as to provide additional step means to facilitate entering and leaving the motor vehicle through the door thereof when open.

In one specific application of the present invention, it may be employed mounted on a motor vehicle of what is commonly known as the "van" type and which has a driver's compartment which at least partially overlies (usually at the rear thereof) the front wheels of the motor vehicle. In this van type of motor vehicle, there are usually two side-positioned front doors mounted in controllably openable and closable relationship at the sides of the driver's compartment and with rear portions of said doors lying substantially directly over corresponding ones of the above-mentioned pair of front wheels supporting the front end of the motor vehicle. An arrangement of the type just referred to is usually made possible by having the rear portion of each of the two side positioned front doors cut away at the bottom so as to be substantially shorter in a vertical direction than the front portion of said door. This allows the rear cut-away portions of said vehicle doors to lie directly over corresponding front fender portions positioned outwardly of and over the corresponding wheel wells formed in the side of the vehicle body so as to accommodate the two previously-mentioned side-positioned front wheels of the vehicle.

The van type of motor vehicle referred to above does not provide convenient access into the interior of the driver's compartment unless the particular door selected for entry into said driver's compartment is opened quite widely so that access is had to the substantially completely open front portion of the door opening where a small step or running board is normally positioned as an effective extension of the corresponding front fender. If the door can be opened to the extent necessary to step onto said front-positioned auxiliary step, it is not too difficult to step into the driver's compartment of the vehicle, although women wearing relatively tight skirts find some difficulty in entering or leaving the driver's compartment under the circumstances just outlined—that is, with the door completely open.

A quite-different situation exists when it is not possible to open the vehicle door to the completely wide-open relationship referred to above. When this is the situation—that is, the vehicle door can only be partly opened because of some laterally adjacent obstruction such as will frequently be found when side-by-side or angle-type parking of a plurality of motor vehicles is allowed—and under many other circumstances, it will be found virtually impossible to reach the small, forwardly-positioned step because the door is not open wide-enough to provide access to said forwardly-positioned step. Therefore, the only way that one could possibly enter the vehicle under such circumstances would be to climb onto the fender and then into the driver's compartment, which is extremely difficult for any person to do and virtually impossible for a woman wearing a tight dress to do.

The novel extendable and retractable step apparatus of the present invention virtually completely solves and overcomes the above-mentioned prior art problem because it allows one or two (preferably two) controllably extendable and retractable step means to be positioned within the wheel well of a vehicle and firmly supported by the frame and/or body of the vehicle and normally retracted so as to be within the plan view conlguration of the vehicle—in other words, not extending outwardly beyond the side wall of the body and/or the edge of the fender of the motor vehicle so that said extendable and retractable step means is completely unobtrusive and innocuous and non-functional when in said retracted relationship.

However, when actuated in an extension manner, usually in response to the opening of the vehicle door and the automatic closure of the door-operated switch means usually mounted adjacent to the hinge end of the door, said extension step means will automatically extend outwardly into a protruding relationship with respect to the side of the motor vehicle and in a properly laterally and vertically spaced relationship to effectively provide two auxiliary steps adjacent to the extreme rear end of the door opening and upon which a person can easily step upwardly into the vehicle's driver's compartment by way of said two auxiliary steps provided by said extended step means of the present invention.

When the person entering the vehicle has gotten into the driver's compartment, he or she may then cause the steps to be retracted into their normal non-projecting relationship. In one form of the invention, this is accomplished by merely closing the door which opens the door-operated switch and causes the effective retraction of the extended step means.

Of course, it should be understood that the apparatus of the present invention is equally adaptable for use in facilitating leaving the driver's compartment of a motor vehicle, and the operation thereof for such a purpose is essentially the same as that described hereinbefore with respect to facilitating entry into the driver's compartment of a motor vehicle.

While the door-operated switch means type of control of the extension and retraction of the step apparatus as referred to above provides a very effective arrangement, it is also possible for manually operable switch means (one or more of such switch means positioned as desired) to be employed for initiating the extension of the step means when desired and for initiating retraction of the step means when desired. Such manually operable switch means might be located on or adjacent to the dashboard of the vehicle inside of the driver's compartment to allow the driver to conveniently operate same from that location and, if desired, another such manually operable switch means may be located at or adjacent to either or both of the side-positioned front doors of the vehicle so that a person entering or leaving the vehicle may initiate the extension operation or retraction operation of the step means from said exterior location. The latter initiation switch may, if desired, even be positioned in or adjacent to the closed rear end of the door or the door frame so that when the door is opened, the person may operate same as desired. Also, if desired, either or both of the operation-initiating switch means may be key-operated so as to positively prevent operation by any unauthorized person.

With the above points in mind, it is an object of the present invention to provide a novel extendable and retractable step apparatus of the character referred to herein, generically and/or specifically, which may include any or all of the features referred to herein, either individually or in combination, and which is of extremely simple, inexpensive construction suitable for ready mass manufacture at a relatively low cost and adapted to be either mounted on a motor vehicle as original equipment or subsequent to the sale and distribution of the motor vehicle—in this latter case comprising attachment apparatus adapted to be mounted on such a pre-existing motor vehicle; all of the above features being conducive to widespread production, distribution, and use of the invention for the purposes outlined herein.

It is a further object to provide apparatus of the character referred to herein which may be limited to a single controllably extendable and retractable step means unit or to two such units, three such units, or any desired number thereof, all of which may be arranged to be operated in similar extension and retraction manners at substantially the same time by driving means for effectively coupling same for such similar actuation and with at least one electrically energizable, controllably extendable and retractable actuator means driving at least one of the step units. In one form of the invention, said driving means effectively causing simultaneous similar actuation of a plurality of the step means units may merely comprise mechanical coupling means mechanically coupling together driven step means units and a driving step means unit which, in turn, is extended and retracted by an actuator means. In another form of the invention, said driving means may be of an electrical nature and may comprise switching means and electric circuit means electrically coupling a plurality of actuator means to the corresponding plurality of said step means units for similar extension and retraction thereby. In other words, virtually any number of step means units may be employed and virtually any means for causing similar extension and retraction thereof in desired relationships may be employed within the broad scope of the present invention.

Further objects are implicit in the detailed description which follows hereinafter (which is to be considered as exemplary of, but not specifically limiting, the present invention), and said objects will be apparent to persons skilled in the art after a careful study of the detailed description which follows.

For the purpose of clarifying the nature of the present invention, two exemplary embodiments of the invention (and several slight variations thereof) are illustrated in the hereinbelow-described figures of the accompanying single drawing sheet and are described in detail hereinafter.

FIG. 1 is a fragmentary perspective view of one exemplary van-type motor vehicle showing a near one of the two side-positioned front doors thereof fragmentarily and in substantially fully-open relationship with respect to the driver's compartment of the motor vehicle. This view also shows a near part of the body broken away in order to clearly illustrate one exemplary form of the present invention shown in mounted and fully-extended relationship with respect to the motor vehicle.

FIG. 2 is an enlarged fragmentary view, with certain portions removed for reasons of drawing simplicity and clarity, taken substantially along the plane indicated by the arrows 2—2 of FIG. 1.

FIG. 3 is an electrical schematic view fragmentarily illustrating the exemplary embodiment of the invention shown in FIGS. 1 and 2 and illustrating, in broken lines, an alternate form of the invention wherein each step means has its own motor (and associated actuator means of which it is a part and which is operated thereby) for extending and retracting the corresponding step means.

FIG. 4 is a fragmentary electrical schematic view illustrating a modification of the form of the invention illustrated in FIGS. 1–3; said modification comprising replacement of just certain specifically designated input portions of the circuit means sechematically shown in FIG. 3 so as to substitute a pair of manually operable switch means for the pair of door-operated switch means illustrated in FIG. 3. It is to be understood that the remainder of the circuit of FIG. 3 is to be coupled to, and associated with, the fragmentary, modified portion thereof shown in FIG. 4 in a manner analogous to the showing of FIG. 3.

FIG. 5 is a fragmentary view, with certain portions of the structure removed for reasons of drawing simplicity and clarity, generally similar to FIG. 2 but illustrating a modified form of the invention.

Generally speaking, the present invention comprises at least one controllably extendable and retractable step means, mounting means for mounting same at a desired location, electrically controllably operable actautor means for controllably extending and retracting the step means, and electric circuit means and associated switch means for controllably energizing the actuator means in an extension manner when desired and in a retraction manner when desired (such as, for example, in an extension manner when a door positioned adjacent to the step means is opened and in a retraction manner when the door positioned adjacent to the step means is closed, although not specifically so limited).

In the specific exemplary first form of the invention illustrated, the apparatus includes two such controllably extendable and retractable step means generally designated by the reference numerals 20 and 22, respectively.

In said exemplary first form of the invention illustrated, the mounting means for the first and lowermost step means 20 is generally designated by the reference numeral 24 and comprises a longitudinal bracket member 26 having a central rectangular aperture 28 extending inwardly and outwardly therethrough and having fastening ears 30 lying against the bottom surface of the frame member 32 and firmly fastened thereto by the threaded fasteners 34. In other words, the mounting means 24 may be said to comprise a mounting bracket attachment and fastening means and, while it is shown in the example illustrated as being fastened to the frame member 32, it is not so limited and it may be fastened to any other portion of the frame or body of the van-type motor vehicle, which is generally designated by the reference numerals 36, as best shown fragmentarily in FIG. 1.

The mounting bracket attachment and fastening means 24 mounts the first or lower step means 20 for extension and retraction by slidably carrying through the aperture or hole 28 thereof a longitudinal connecting rod and supporting member 38 of similar rectangular cross-sectional shape, which has a foot-engageable, horizontally-enlarged step or platform portion 40 at its outer end, which may be provided with a frictional foot-tread 41 at the top thereof if desired. Thus, the arrangement illustrated allows the longitudinal connecting rod and supporting member 38 and the foot-engageable platform portion 40 at the outer end thereof to slidably move inwardly or outwardly relative to the mounting bracket and attachment means 24, as determined by the operation of the electrically operable linear extension actuator means, generally designated by the reference numeral 42, which will be described in greater detail hereinafter.

In the exemplary first form of the invention illustrated, the second or upper step means 22 is of generally similar construction to the lower step means 20, with two major exceptions. First, the upper mounting bracket attachment means, generally designated at 44, is fastened differently from the previously-described mounting bracket and attachment means 24 and also the upper step means 22 does not have its own actuator means comparable to that generally designated at 42 and in driving relationship with respect to the lower step means 20.

To be more specific with respect to the upper step means 22, it should be noted that it includes a horizontally-enlarged foot-engageable platform portion 46, having a top frictional foot tread 47, and integrally carried at the outer end of a longitudinal connecting rod and supporting member 48 of rectangular cross-sectional shape, which is horizontally slidably mounted in the similarly shaped aperture 50 within the upper mounting bracket and attachment means 44, which is fastened by the threaded fastener means 52 to the side wall body portion 54 of the van-type motor vehicle 56, whereby to slidably mount the longitudinal connecting rod 48 and the outer foot-engageable platform portion 46 for slidable retraction movement inwardly and extension movement outwardly relative to the upper mounting bracket attachment and fastening means 44 in a manner similar to the mounting of the lower connecting rod 38 and foot-engageable platform member 40 for such slidable inward retraction movement and outward extension movement relative to the lower mounting bracket and fastening means 24. In fact, as will be clarified hereinafter, both of these extension movements occur simultaneously and in unison and both of these retraction movements occur simultaneously and in unison.

It will be noted that the positioning of the lower and upper mounting means 24 and 44 is such as to provide a desired vertical and forward spacing therebetween such as is most clearly apparent in FIG. 1 and which is suitable for providing a convenient series of two steps, comprising the platform members 40 and 46 shown, which a person can successively step onto in climbing into the driver's compartment, generally designated at 56, of the van-type motor vehicle 36 through the opening provided by reason of the fact that the door 58 has been previously opened.

The actuator means, generally designated at 42 in the exemplary first form of the invention illustrated, comprises a reversible driving electric motor means 60 and power transmission means, one form of which is generally designated at 62 as best shown in FIG. 2, which is connected between the motor 60 and the longitudinal connecting rod and supporting member 38 of the lower step means 20. Therefore, electrical energization of the motor 60 in what might be termed an extension direction of rotation will cause the lower connecting rod member 38 and the foot-engageable platform member 40 carried at the outer end thereof to be extended into the fully-extended relationship shown in solid lines in FIGS. 1 and 2. Conversely, electrical energization of the motor in the opposite direction of rotation, which might be termed a retraction direction of rotation, will cause the connecting rod 38 and the foot-engageable platform 40 carried at the outer end thereof to be retracted into the fully-retracted relationship shown fragmentarily in phantom in FIG. 2.

In the exemplary first form of the invention illustrated, the above-mentioned power transmission means, generally designated at 62, takes the form of rack-and-pinion power transmission means 62 including a rack 64 carried along one side surface of the rectangular connecting rod member 38 and a pinion or spur gear 66 mounted on the motor output shaft 68. Therefore, since the motor 60 is fixedly mounted by the fastening means 70 to the frame member 32, rotation of the output shaft 68 and pinion or spur gear 66 in an extension direction will positively drive the rack 64, connecting rod 38, and the foot-engageable platform member 40 outwardly toward fully-extended relationship, such as is shown in FIG. 2. On the other hand, it will be understood that rotation of the motor output shaft 68 in the opposite, or retraction, direction of rotation will rotate the pinion or spur gear 66 in said opposite direction and positively move the rack 64 toward the left as viewed in FIG. 2, which is a retraction direction, such as to fully retract the connecting rod 38 and the foot-engageable platform member 40 toward the fully-retracted relationship shown in phantom in FIG. 2.

At this point it should be noted that various other power transmission means may be employed in lieu of the exemplary rack-and-pinion power transmission means shown at 62 in FIG. 2. One such alternate form is illustrated in FIG. 5 and will be referred to hereinafter, and other power transmission means capable of functioning for the purposes of the present invention are also intended to be included and comprehended within the broad scope of the present invention.

Initiation of energization of the motor means 60 in the above-mentioned extension direction and in the above-mentioned retraction direction is accomplished by the same electrical switch means, which is generally designated by the reference numeral 72 in FIGS. 1 and 3 and which comprises both an energization initiation switch means for the extension direction of operation of the motor 60 and an energization initiation switch means for the retraction direction of operation of the motor 60. In other words, the common energization initiation switch means 72, depending upon whether it is closed or opened, initiates the corresponding extension or retraction operation of the motor 60 and of the complete actuator means 42. Therefore, closure of said switch 72 starts extension of the lower step means 20 (and also the upper step means 22 in a manner which will be clarified hereinafter) outwardly into the fully-extended relationship, and conversely opening said switch 72 initiates retraction of said step means 20 (and said step means 22).

Since the switch means 72 comprises a conventional door-operated, resiliently biased type of switch which is normally spring biased into closed relationship when the door 58 does not force it into open relationship, which occurs only when the door 58 is closed, it is quite apparent that the opening of the door 58 from its normal closed relationship, will cause the door-operated energization initiation switch 72 to initiate energization of the motor 60 and the actuator means 42 in an extension direction, while closure of the door 58 will cause the door-operated switch means 72 to effectively initiate energization of the motor means 60 and the actuator means 42 in the opposite, or retraction, direction of operation thereof.

From the above general description of the exemplary first form of the invention, it will be understood that whenever the vehicle door 58 is closed, the lower step means (and also the upper step means 22) are in fully-retracted relationship. However, whenever the door 58 is opened, said lower step means 20 (and also the upper step means 22) are extended into the fully-extended relationship thereof and are available for use as supplementary steps for facilitating entry into or exit from the driver's compartment 56 of the motor vehicle 36.

Reference will now be made primarily to FIG. 3, comprising a fragmentary electrical schematic view of the exemplary first form of the invention, and it will be noted that it includes electric circuit means, such as is generally designated by the reference numeral 74, adapted to be connected to a suitable source of electric power which, in the example illustrated, comprises the conventional battery circuit 76 found in most motor vehicles and which is shown as being connected to the positive terminal 78 of a battery 80, which has its negative terminal 82 connected to ground. However, it should be noted that various other connection arrangements and/or sources of electric power may be employed in various forms of the invention.

In the exemplary arrangement illustrated in FIG. 3, the electric circuit means 74 includes the previously-mentioned energization initiation switch means 72 which is of the door-operated type, as best shown in FIG. 1, and also includes a pair of energization termination switch means 84 and 86, each positioned at a different end of the path of travel of the longitudinal connecting rod 38 for opening operation thereby when a full extension position is reached and when a full retraction position is reached, respectively.

It will be noted that in the exemplary form illustrated in FIG. 3, each of said energization termination switch means, comprising the extension termination switch means 84 and the retraction termination switch means 86, is of the normally biased-closed type and is adapted to only be moved into open relationship when impacted by the corresponding abutment element 88 and 90, respectively, at the end of an extension movement or a retraction movement, respectively. In other words, said two energization termination switch means 84 and 86 comprise limit switch means so arranged in the electric circuit means 74 that when either is opened, the corresponding motor leads 92 and 94 are de-energized, respectively, thus stopping either the immediately preceding extension operation of the motor 60 or retraction operation of the motor 60.

It is important for the foot-engageable platform portions 40 and 46 to be relatively stable and immovable when one steps thereupon. Rotative immobility is imparted by reason of the fact that the two connecting rods 38 and 48 are of non-round, substantially rectangular, cross-sectional configuration and slide in the two corresponding longitudinal apertures or slideways 28 and 50, respectively, which are similarly shaped. Longitudinal immobility is imparted to the foot-engageable step portions 40 in one exemplary form of the invention by reason of the fact that the motor 60 may be of the self-braking type adapted to automatically lock and immobilize the rotor (not shown) upon cessation of rotation of the output shaft 68. Such self-braking action may be provided by brake means adapted to be disengaged or effectively rendered inoperative upon initiation of energization of the motor for rotation in either the extension direction of rotation or the retraction direction of rotation, by electrically or electromagnetically self-braking means, or by various other well-known types of positive braking action arrangements for such a motor.

The connecting rod 48 of the upper step means 22 is provided with driving means for effectively driving it in an extension manner or in a retraction manner in correspondence with the operation of the lower step means 20 in an extension manner or a retraction manner by the actuator means 42. While said driving means or coupling means may take a variety of forms, in the first example illustrated it is shown as comprising a mechanical coupling bar 96 rigidly and firmly connecting the two connecting rods 38 and 48 together for simultaneously causing extension and retraction of both the lower and upper connecting rods 38 and 48 and for providing a very firm and structurally strong coupling therebetween. However, it should be noted that other types of mechanical coupling means or driving means may be employed in lieu of the bar 96 and, in some forms of the invention, the driving means or effective coupling means may be electrical in nature, as is illustrated in broken lines in FIG. 3, where a second motor 98 of a corresponding second actuator 99 generally similar to the first motor 60 and the first actuator 42 may directly drive the upper connecting rod 48 in an extension and retraction manner. However, this is an optional, alternate arrangement to the mechanically-coupled arrangement illustrated in the first form of the invention.

It should be understood that, if desired, additional upper mounting means and additional lower mounting means for improving the structural rigidity and strength of the mounting of the upper connecting rod member 48 and the lower connecting rod member 38 may be employed. In FIG. 2 such additional or alternate mounting means are shown in phantom at 44 and 24, respectively, and it will be noted that they are positioned outwardly or toward the right as viewed in FIG. 2 as far as possible while still allowing the retraction of the foot-engageable upper and lower portions 46 and 40 so as to not protrude beyond the side of the motor vehicle 36. This also makes necessary the moving of the limit switch 86 to the location shown in phantom at the front edge of said auxiliary lower mounting bracket 24, which is also shown in phantom in FIG. 2. The upper end of both auxiliary mounting means 44 and 24 may be attached firmly by attachment means 53 to the fender portion 55 or may be otherwise suitably attached as desired. It should be understood that various other types of mounting means may also be employed in lieu of the arrangement described and illustrated.

The apparatus operates in accordance with the brief description thereof set forth hereinbelow.

When the door 58 is closed, the switch 72 is held open, as is shown in FIG. 3. At the same time, the limit switch 86 is also held open by abutment of the rear contact abutment surface 90 of the coupling member 96 with the front-positioned switch 86. The other limit switch 84 is in its normally spring-biased-closed relationship. The two relay switches 100 and 102 are in their normally spring-biased-closed relationships. Thus, it will be seen that the circuit lead 92 to the motor 60, which is the one causing energization of the motor in an extension direction, is de-energized, and this is also true of the circuit lead 94 to the motor 60, which comprises the retraction energization lead, which is also de-energized. Thus, the motor 60 is not energized for rotation in either direction. However, as soon as the door 58 is opened to a degree such as to allow the door-operated switch 72 to automatically move into its normal spring-biased-closed relationship, several things will happen immediately, as enumerated below.

First, the extension circuit lead 92 to the motor 60 will be energized and the motor 60 will begin to rotate in an extension direction such as to cause the actuator 42 to operate in an extension direction and cause extension of both of the coupled connecting rods 38 and 40, and the outer step portions 40 and 46 thereof, until such time as said extension operation of the motor 60 and actuator 42 is terminated by abutment of the abutment member 88 of FIG. 2 against the other energization termination limit switch means 84, which is normally spring-biased closed, but which, when so abutted, is moved into open relationship immediately at the end of the complete extension operation of the motor 60. This causes the motor 60 to become de-energized and to stop with both step means 20 and 22 in the fully-extended relationship shown in FIGS. 1 and 2.

The second thing which occurs when the door 58 is opened, as mentioned above, to the point where the door-operated switch 72 is closed, is the fact that the conventional dome light 104 of the motor vehicle 36 is energized in a conventional manner (which need not concern us) and the fact that the two holding relay coils 106 and 108 are energized to an extent such as to forcibly open the previously spring-biased-closed relay switches 100 and 102 and to maintain them open as long as said coils 106 and 108 remain energized.

However, as soon as the fully-extended relationship of both step means 20 and 22 is achieved, and the limit switch 84 is forcibly opened from its normally-closed relationship, as mentioned above, the first relay coil 106 will be de-energized, allowing the normally spring-biased-closed relay switch 100 to again close. However, this does nothing with respect to energization or deenergization of the motor 60 until such time as the door 58 is again closed sufficiently to allow the normally-closed switch 72 to be forcibly opened by the door 58. When this occurs, the other relay coil 108 is also deenergized, thus allowing the other normally spring-biased-closed relay switch 102 to close. This closes the circuit to the retraction motor lead 94, since the other limit switch 86 in said lead has been closed since the very beginning of the extension operation previously described.

Therefore, the motor 60 and the actuator 42 will immediately be energized in a retraction direction following the opening of the door-operated switch 72 in response to closure of the door 58 and will retract the lower and upper step means 20 and 22 into the fully-retracted relationship shown fragmentarily in phantom lines in FIG. 2, at which time the rear abutment surface 90 of the mechanical coupling bar 96 strikes the front-positioned retraction movement termination switch means 86, which is normally closed, and forcibly opens same, thus de-energizing the retraction motor circuit 94 and stopping the retraction movement. It will be found that the apparatus is now in precisely the same condition as illustrated in FIG. 3 and as it was prior to the beginning of the first extension operation described above.

The lower switch means 72' shown in FIG. 3 merely indicates another parallel connected door-operated switch identical to the one shown at 72 and adapted to be similarly operated by the door (not shown) positioned on the other side of the driver's compartment 56 of the motor vehicle 36. The three connection points 110', 112', and 114' correspond functionally to the three connection points 110, 112, and 114, and it should be understood that a precisely identical circuit to that shown to the right of said connection points 110, 112, and 114 is adapted to be connected to the lower connection points 110', 112', and 114' for operation of the other pair of step means on the other side of the motor vehicle 36 and similar to those shown at 20 and 22 on the near side of the motor vehicle 36.

A jeweled indicator light 116 is connected through a current-limiting resistor or other equivalent device 118 and ground is provided for the purpose of being electrically energized and therefore illuminated whenever the retraction-operation-stopping limit switch 86 is closed, which corresponds physically to a condition where the two step means 20 and 22 are in partially or wholly extended relationship. The jeweled indicator light 116 may be mounted on the dashboard of the motor vehicle 36 or at any other convenient location for visual observation and, if desired, several such jeweled indicator lights may be so connected, either in series or parallel. The purpose of the one or more jeweled indicator lights is to provide a positive warning of the fact that the step means 20 and 22 are not fully retracted as they normally should be except when actually in use.

FIG. 4 illustrates fragmentarily in electrical schematic form a slight variation of the invention, and similar parts are designated by similar reference numerals, followed by the letter a, however. It will be noted that the connection points 110a, 112a, and 114a correspond to the connection points 110, 112, and 114 of the FIG. 3 form of the invention, and it should be understood that a precisely identical circuit to that shown to the right of said connection points 110, 112, and 114 is adapted to be connected to the connection points 110a, 112a, and 114a of the FIG. 4 modification of the invention.

In other words, only the door-operated switch means 72 of the FIG. 3 form of the invention has been modified in the FIG. 4 form of the invention, and in lieu thereof a first pushbutton-operated switch 116 is connected alternatively between either of two circuit leads 118 and 120, and a similar pushbutton-operated switch means 122 is similarly connected between said two circuit leads 118 and 120.

Each of said pushbutton-operated switches 116 and 122 in the FIG. 4 form of the invention is of the snap-action, alternately-oppositely-positioned type—that is, when operated a first time, it snaps to one extreme position, closing the circuit to the lead 118; and when operated the next time, it snaps to the other position, closing the circuit to the other lead 120. It will be understood that one of the snap-action switches 116 may be positioned on the dashboard (not shown) of the motor vehicle 36 while the other pushbutton-operated snap-action switch means 122 may be positioned immediately inside of either the door 58 or the door frame 124 in a position such as is shown in broken lines in FIG. 1 so that, when the door 58 is opened, manual access to the snap-action switch 122 may be had for operating same. Thus, the step means 20 and 22 may be either extended or retracted by a person in a position within the driver's compartment 56 and/or can be extended or retracted by a person in a position standing alongside of the open door 58.

It will be understood that when the door 58 is closed, the snap-action pushbutton-operated switch 122 will no longer be accessible for manual operation and, thus, if the door 58 is locked, this will positively prevent any unauthorized person from operating the apparatus. On the other hand, if desired, the switch 122 (and also the other switch 116 in some cases) may be arranged to be operated only by a key, or combination lock, in order to prevent unauthorized personnel from operating same.

FIG. 5 merely illustrates fragmentarily a slight modification of the actuator means 42 and power transmission means 62 of the first form of the invention and, therefore, the corresponding actuator means and power transmission means are designated in FIG. 5 by the reference numerals 42b and 62b, respectively. Also, all other functionally similar parts are designated by similar reference numerals, followed by the letter b, however.

It will be noted that the major modification of the FIG. 5 form of the invention comprises the changing of the power transmission means 62b from the rack-and-pinion type shown in FIG. 2 at 62 to a worm and worm gear type, such as is generally designated at 62b in FIG. 5, which includes a worm 66b driven by the output shaft 68b of the motor 60b which is coupled in driving relationship with respect to a longitudinally-arranged worm gear 64b, which functionally corresponds to the rack 64 of the first form of the invention. Otherwise, the FIG. 5 modification of the invention is substantially the same as the first form of the invention and requires no further detailed description.

It should be clearly understood that the worm 66b and worm gear 64b cooperate in a one-way power-transmission direction—that is, only as a result of power transmitted from the motor 60b through the output shaft 68b and worm 66b to the worm gear 64b for extension or retraction of the longitudinal connecting rod 38b in correspondence with the direction of rotative energization of the motor 60b. However, it is not possible to forcibly manually or otherwise move the worm gear 64b and thereby cause rotation of the worm 66b in a reverse power transmission direction. Thus, whenever the motor 60b is de-energized, the longitudinal connecting rod 38b is positively locked in either the extended relationship or retracted relationship thereof, and it is not necessary for the motor 60b to be of a self-braking type as referred to in the first form of the invention in order to achieve such a positive locking of the extended or retracted step means.

It should be noted that no housing is shown around the motor 60, the power transmission means 62 and the complete actuator means 42 of the first form of the invention nor around the corresponding parts of the modified actuator means 62b of the modified form of the invention. This is done for purposes of drawing simplicity and clarity. However, it should be clearly understood that, in actuality, said structures would normally be substantially enclosed within appropriate housing means, and such an arrangement is intended to be included and comprehended within the broad scope of the present invention.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

We claim:

1. Extendable and retractable step apparatus comprising: at least one controllably extendable and retractable step means including mounting attachment and fastening means cooperable for mounting attachment with respect to an auxiliary structural supporting member, said mounting attachment and fastening means, when so mounted, acting to position said step means in a laterally directed, normally retracted, position adjacent to an elevated door-opening and a door therefor for extension into a laterally projecting foot-accessible position below the elevated door-opening for convenient use in stepping therethrough, said controllably extendable step means including a foot-engageable step platform portion, a longitudinal connecting rod and supporting member extending inwardly therefrom and controllably electrically energizable and de-energizable electrically operable extension actuator means effectively coupled with respect to said connecting rod and supporting member for controllable outward extension thereof when said actuator means is energized in an extension manner and for controllable retraction thereof when said actuator means is energized in a retraction manner; and electric circuit means adapted to be connected to a suitable source of electric power and provided with energization initiation switch means for initiating electrical energization of said actuator means in said extension manner when said switch means is controllably operated in a corresponding extension manner and for initiating electrical energization of said actuator means in said retraction manner when said switch means is controllably operated in a corresponding retraction manner; said controllably extendable and retractable step means comprising a second extendable step means having a second mounting attachment and fastening means, a second foot-engageable step platform portion, a second longitudinal connecting rod and supporting member extending inwardly therefrom, all similar to the corresponding parts of the first-mentioned step means and adapted to be similarly mounted by said second mounting attachment and fastening means in a predetermined laterally and vertically displaced relationship relative to said first-mentioned step means for providing two sequential steps of appropriate forward and vertical spacing adapted to span the gap between ground level and a desired elevated door-opening level, and driving means for effectively driving said second longitudinal connecting rod and supporting member and foot-engageable step platform portion in extension and retraction manners in correspondence with the operation of said first-mentioned step means by said actuator means.

2. Apparatus as defined in claim 1, wherein said electric circuit means is also provided with energization termination switch means comprising limit switch means effectively positioned in the path of travel of a portion of said step means moved by said actuator means in said extension manner for termination of extension operation of said actuator means in a predetermined extended relationship of said step means and positioned in the path of travel of a portion of said step means moved by said actuator means in said retraction manner for termination of retraction operation of said actuator means in a predetermined retracted relationship of said step means.

3. Apparatus as defined in claim 1, wherein said energization initiation switch means comprises a door-operable switch adapted to be mounted for operation by a door when opened for electrically energizing said actuator means in said extension manner and for electrically energizing said actuator means in said retraction manner in response to closing the door.

4. Apparatus as defined in claim 2, wherein said energization initiation switch means comprises a door-operable switch adapted to be mounted for operation by a door when opened for electrically energizing said actuator means in said extension manner and for electrically energizing said actuator means in said retraction manner in response to closing the door.

5. Apparatus as defined in claim 1, wherein said energization initiation switch means comprises at least one controllably manually operable switch adapted to be mounted at a convenient position for operation by a person intending to step through an elevated door-opening.

6. Apparatus as defined in claim 1, wherein said energization initiation switch means comprises a pair of manually controllably operable switches adapted to be mounted at convenient positions outwardly and inwardly of an elevated door-opening for corresponding operation by a person intending to step through an elevated door-opening inwardly or outwardly, respectively.

7. Apparatus as defined in claim 1, wherein said actuator means comprises a reversible driving electric motor and power transmission means connected between the driving motor and said connecting rod and supporting member of said step means.

8. Apparatus as defined in claim 1, wherein said actuator means comprises a reversible driving electric motor and power transmission rack-and-pinion gear means connected between the driving motor and said connecting rod and supporting member of said step means.

9. Apparatus as defined in claim 1, wherein said actuator means comprises a reversible driving electric motor and power transmission worm-and-worm gear means connected between the driving motor and said conecting rod and supporting member of said step means.

10. Apparatus as defined in claim 7, wherein said driving electric motor is of an automatically self-braking type adapted to brake itself in response to cessation of electrically caused rotative driving operation of the motor.

11. Apparatus as defined in claim 1, wherein said driving means comprises mechanical coupling means effectively mechanically coupling said first-mentioned longitudinal connecting rod and supporting member to said second longitudinal connecting rod and supporting member.

12. Apparatus as defined in claim 1, wherein said driving means comprises mechanical coupling bar means effectively mechanically coupling said first-mentioned longitudinal connecting rod and supporting member rigidly to said second longitudinal connecting rod and supporting member.

13. Apparatus as defined in claim 1, wherein said driving means comprises electrical coupling means effectively electrically coupling said first-mentioned longitudinal connecting rod and supporting member with respect to said second longitudinal connecting rod and supporting member for similar extension and retraction movements thereof.

14. Apparatus as defined in claim 1, wherein extendable and retractable step apparatus comprising: at least one controllably extendable and retractable step means including mounting attachment and fastening means cooperable for mounting attachment with respect to an auxiliary structural supporting member, said mounting attachment and fastening means, when so mounted, acting to position said step means in a laterally directed, normally retracted, position adjacent to an elevated door-opening and a door therefor for extension into a laterally projecting foot-accessible position below the elevated door-opening for convenient use in stepping therethrough, said controllably extendable step means including a foot-engageable step platform portion, a longitudinal connecting rod and supporting member extending inwardly therefrom and controllably electrically energizable and de-energizable electrically operable extension actuator means effectively coupled with respect to said connecting rod and supporting member for controllable outward extension thereof when said actuator means is energized in an extension manner and for controllable retraction thereof when said actuator means is energized in a retraction manner; and electric circuit means adapted to be connected to a suitable source of electric power and provided with energization initiation switch means for initiating electrical energization of said actuator means in said extension manner when said switch means is controllably operated in a corresponding extension manner and for initiating electrical energization of said actuator means in said retraction manner when said switch means is controllably operated in a corresponding retraction manner; said longitudinal connecting rod and supporting member and the cooperating portion of said mounting attachment and fastening means being effectively provided with rotation-preventing means for positively preventing relative rotation thereof around a longitudinal horizontal axis thereof and for thus maintaining the corresponding foot-engageable outer portion thereof in a substantially horizontal position.

References Cited

UNITED STATES PATENTS

| | | | |
|---|---|---|---|
| 988,363 | 4/1911 | Malocsay | 105—445 |
| 990,574 | 4/1911 | Malocsay | 105—444 |

BENJAMIN HERSH, *Primary Examiner.*

J. SIEGEL, *Assistant Examiner.*